US011434758B2

(12) United States Patent
Pal et al.

(10) Patent No.: US 11,434,758 B2
(45) Date of Patent: Sep. 6, 2022

(54) METHOD OF ASSESSING AN OIL RECOVERY PROCESS

(71) Applicant: North Oil Company, Doha (QA)

(72) Inventors: Mayur Pal, Doha (QA); Prabhat Saxena, Doha (QA); Sharon Jane Finlay, Doha (QA)

(73) Assignee: NORTH OIL COMPANY, Doha (QA)

( * ) Notice: Subject to any disclaimer, the term of this patent is extended or adjusted under 35 U.S.C. 154(b) by 265 days.

(21) Appl. No.: 16/876,057

(22) Filed: May 17, 2020

(65) Prior Publication Data

US 2021/0355824 A1 Nov. 18, 2021

(51) Int. Cl.
*E21B 49/08* (2006.01)
*G01V 3/34* (2006.01)
*G01V 3/32* (2006.01)
*E21B 43/20* (2006.01)

(52) U.S. Cl.
CPC .......... *E21B 49/0875* (2020.05); *E21B 43/20* (2013.01); *G01V 3/34* (2013.01); *G01V 3/32* (2013.01)

(58) Field of Classification Search
CPC ..... E21B 49/0875; E21B 49/087; G01V 3/32; G01V 3/34
See application file for complete search history.

(56) References Cited

U.S. PATENT DOCUMENTS

| | | | | |
|---|---|---|---|---|
| 4,102,396 A | * | 7/1978 | Ransom | E21B 49/00 73/152.41 |
| 4,124,800 A | * | 11/1978 | Mitchell | E21B 47/11 250/260 |
| 4,168,746 A | * | 9/1979 | Sheely | C09K 8/58 436/27 |
| 4,529,878 A | * | 7/1985 | Haley | G01V 5/107 250/269.5 |
| 5,212,093 A | * | 5/1993 | Richardson | E21B 49/00 436/27 |
| 8,939,211 B2 | * | 1/2015 | McGuire | C09K 8/58 166/275 |
| 2003/0178230 A1 | * | 9/2003 | Audibert Hayet | C09K 8/22 175/70 |

(Continued)

FOREIGN PATENT DOCUMENTS

| | | | | |
|---|---|---|---|---|
| CA | 2414809 C | * | 2/2010 | ............... C09K 8/06 |
| CA | 3058843 A1 | * | 5/2020 | ......... E21B 41/0092 |

(Continued)

OTHER PUBLICATIONS

"Feasibility of an EOR MicroPilot for low-Salinity Water Flooding", Morten Kristensen et al., paper presented at International Petroleum Technology Conference, Bangkok, Thailand, Feb. 7-9, 2012.

(Continued)

*Primary Examiner* — Jennifer H Gay
(74) *Attorney, Agent, or Firm* — Hassan Abbas Shakir; Shakir Law PLLC

(57) ABSTRACT

An in-situ method of assessing an oil recovery process from a subsurface reservoir includes the steps of accessing the subsurface reservoir by means of a vertical or horizontal well, conducting a first test to determine a residual oil saturation, and conducting a second test to determine in-situ emulsion formation.

15 Claims, 2 Drawing Sheets

(56) References Cited

U.S. PATENT DOCUMENTS

| | | | |
|---|---|---|---|
| 2009/0255669 A1* | 10/2009 | Ayan | G01V 3/32 |
| | | | 324/306 |
| 2010/0071897 A1 | 3/2010 | Liu et al. | |
| 2010/0264915 A1* | 10/2010 | Saldungaray | E21B 43/16 |
| | | | 324/303 |
| 2011/0278002 A1* | 11/2011 | McGuire | C09K 8/58 |
| | | | 166/305.1 |
| 2012/0024523 A1* | 2/2012 | Ayan | E21B 49/008 |
| | | | 166/250.15 |
| 2012/0330553 A1 | 12/2012 | Mollaei et al. | |
| 2015/0204170 A1* | 7/2015 | Ayan | E21B 43/121 |
| | | | 166/250.01 |
| 2016/0160621 A1* | 6/2016 | Collins | E21B 43/20 |
| | | | 166/275 |
| 2017/0044877 A1* | 2/2017 | Salino | E21B 49/00 |
| 2020/0173975 A1* | 6/2020 | Cinar | G01N 13/00 |
| 2021/0239002 A1* | 8/2021 | Chen | E21B 49/088 |
| 2021/0355824 A1* | 11/2021 | Pal | E21B 43/20 |

FOREIGN PATENT DOCUMENTS

| | | | | |
|---|---|---|---|---|
| CN | 102763118 A | * | 10/2012 | E21B 43/16 |
| CN | 104790945 A | * | 7/2015 | |
| CN | 110374562 A | * | 10/2019 | E21B 33/13 |
| CN | 110439502 A | * | 11/2019 | E21B 33/13 |
| CN | 112727416 A | * | 4/2021 | |
| WO | WO-2010080657 A1 | * | 7/2010 | C09K 8/58 |
| WO | WO-2012017197 A1 | * | 2/2012 | E21B 43/20 |
| WO | WO-2014022611 A1 | * | 2/2014 | C09K 8/58 |
| WO | WO-2021186202 A1 | * | 9/2021 | |

OTHER PUBLICATIONS

"Evaluation of a Pilot Polymer Flood in the Marmul Field, Oman", E.J.L. Koning et al., paper presented at SPE Annual Technical Conference and Exhibition, Oct. 2-5, 1988, Houston, Texas.

\* cited by examiner

METHOD OF ASSESSING AN OIL RECOVERY PROCESS

BACKGROUND OF THE INVENTION

1. Field of the Invention

The present invention relates to a method of assessing an oil recovery process. More specifically, the invention relates to a method of assessing oil recovery by a water injection process.

2. Discussion of the Related Art

Methods of assessing oil recovery processes are known in the art. PCT application WO2014022611A1 describes a method for enhanced oil recovery of oil from a reservoir by waterflooding. US patent application US20120330553A1 describes a method for forecasting an oil recovery process. The method seems to involve the use of a vertical well to determine an oil saturation of a reservoir. Patent reference US20100071897A1 describes a method for optimizing location of wells for oil recovery by using two horizontal wells as pilot wells to check for flow barriers. Non-patent report titled "Feasibility of an EOR MicroPilot for low-Salinity Water Flooding", International Petroleum Technology Conference, Bangkok, Thailand, February 2012, describes a MicroPilot process for measuring residual oil saturation in a vertical well for enhanced oil recovery. A non-patent literature report titled: "Evaluation of a Pilot Polymer Flood in the Marmul Field, Oman", SPE Annual Technical Conference and Exhibition, 2-5 Oct. 1988, Houston, Tex., describes the pilot tests involving a polymer flood on a vertical pilot at Marmul field in Oman.

However, prior art methods require the drilling of a special pilot well to assess the oil recovery process, following which, a production well may be dug. This process is both expensive as well as time consuming. Hence, there is a need in the art for a robust, efficient and inexpensive method of reliably assessing the efficiency of an oil recovery process.

SUMMARY OF THE INVENTION

One embodiment of the present invention is an in-situ method of assessing an oil recovery process from a subsurface reservoir. The method includes the steps of accessing the subsurface reservoir by means of a vertical well or a horizontal well, conducting a first test to determine a residual oil saturation, and conducting a second test to determine an in-situ emulsion formation.

Another embodiment of the present invention is an in-situ method of assessing an oil recovery process from a subsurface reservoir. The method includes the steps of accessing the subsurface reservoir by means of a vertical well or a horizontal well, conducting a first test to determine a residual oil saturation, conducting an additional test to determine a change in the residual oil saturation, and conducting a second test to determine an in-situ emulsion formation.

BRIEF DESCRIPTION OF THE DRAWINGS

The foregoing and other features of embodiments of the present invention will become more apparent from the following detailed description of embodiments when read in conjunction with the accompanying drawings. In the drawings, like reference numerals refer to like elements.

DETAILED DESCRIPTION OF THE INVENTION

Figure 1:
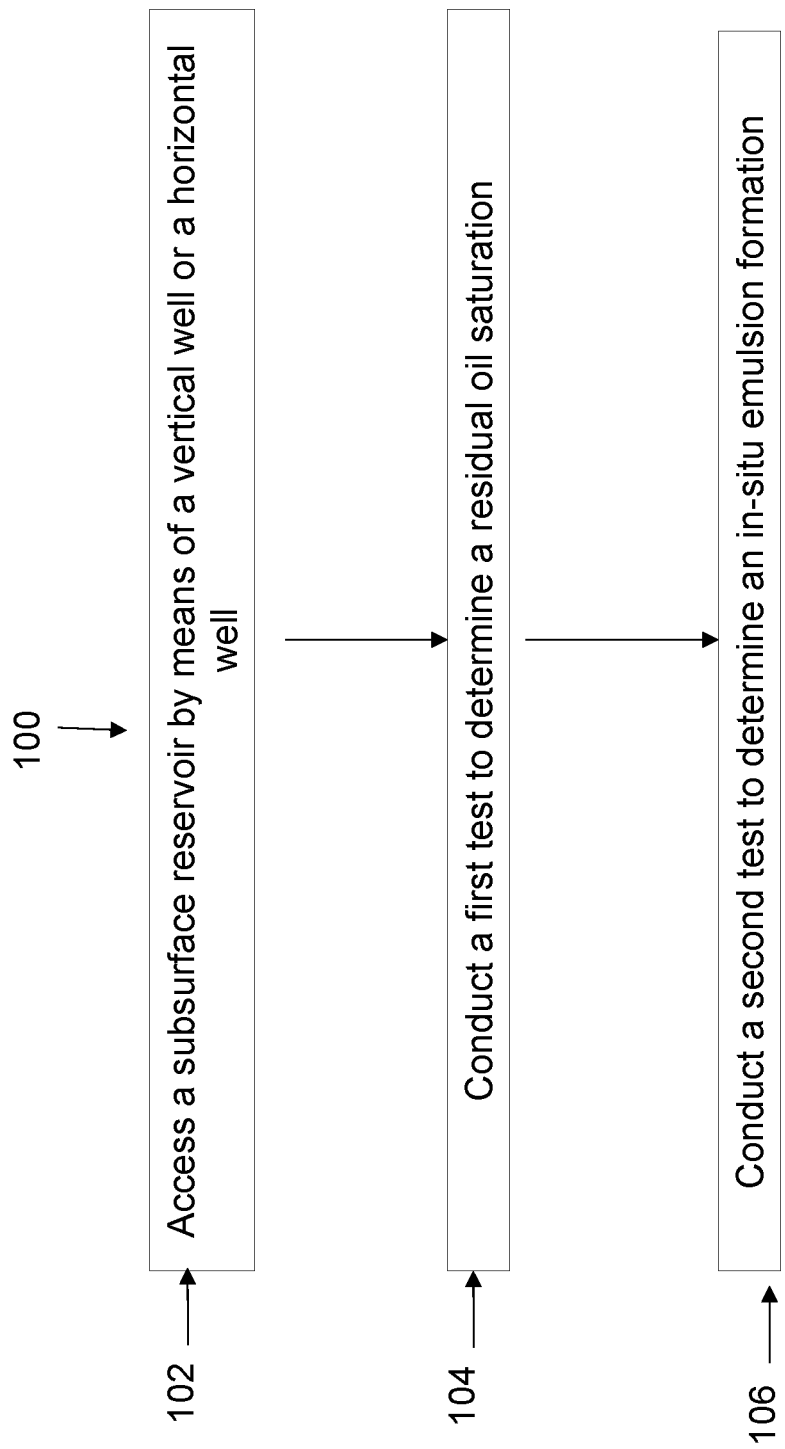
FIG. 1 is a flowchart representing an in-situ method of assessing an oil recovery process from a subsurface reservoir, according to an embodiment of the present invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

In the specification and the claims which follow, reference will be made to a number of terms which shall be defined to have the following meanings:

The singular forms "a", "an" and "the" include plural referents unless the context clearly dictates otherwise. "Optional" or "optionally" means that the subsequently described event or circumstance may or may not occur, and that the description includes instances where the event occurs and instances where it does not. "Substantially" means a range of values that is known in the art to refer to a range of values that are close to, but not necessarily equal to a certain value.

As used herein, "combinations thereof" is inclusive of one or more of the recited elements, optionally together with a like element not recited, e.g., inclusive of a combination of one or more of the named components, optionally with one or more other components not specifically named that have essentially the same function. As used herein, the term "combination" is inclusive of blends, mixtures, alloys, reaction products, and the like.

As used herein, the term "waterflooding" or "water injection" is defined as a process wherein water is injected into an oil reservoir, usually to increase the pressure in the reservoir and thereby stimulate production of oil from the reservoir. The water may or may not contain various additives or synergists that may enhance the production of oil from the reservoir.

As used herein, the term "ppm" refers to "parts per million".

As used herein the term "low-permeability" is defined as a permeability from about 2 millidarcy to about 10 millidarcy.

As used herein the term "injection well" is defined as a well that enables the pumping of a fluid underground into porous rock formations.

As used herein the term "smart water" is defined as water whose composition has been altered by the mixing of certain additives to water. Non-limiting examples of additives include surfactants, emulsifiers, etc. Smart water is used for oil recovery from oil reservoirs.

As used herein the term "production well" is defined as a well that enables oil to be pumped out of an oil-containing underground rock formation.

As used herein, the term "residual oil saturation" is defined as the oil saturation left in a reservoir after extraction is carried out. It refers the reduction of oil saturation which occurs in reservoirs from which oil is being extracted.

As used herein, the term "in-situ emulsion formation" refers to measurement of the extent of oil-water emulsion formed when oil is being extracted by injection of water into the oil reservoir.

One embodiment of the present invention is an in-situ method of assessing an oil recovery process from a subsurface reservoir. The method includes the steps of accessing the subsurface reservoir by means of a vertical well or a horizontal well, conducting a first test to determine a residual oil saturation, and conducting a second test to determine an in-situ emulsion formation.

As depicted in FIG. 1, according to an embodiment of the present invention, an in-situ method 100 for assessing an oil recovery process is shown. The method 100 includes the steps of accessing 102 the subsurface reservoir by means of a vertical well or a horizontal well, conducting 104 a first test to determine a residual oil saturation, and conducting a second test 106 to determine an in-situ emulsion formation.

In an embodiment of the present invention, the first test to determine a residual oil saturation, may be selected from a Chemical Tracer Test, a Saturation Logging Test, Nuclear Magnetic Resonance (NMR), Combined Magnetic Resonance (CMR), Array Dielectric Logging Test, and combinations thereof. In an embodiment of the present invention, the first test to determine a residual oil saturation, is a chemical tracer test. In an embodiment of the present invention, the chemical tracer test is a single well chemical tracer test. In an embodiment of the present invention, the chemical tracer test may be an inter-well chemical tracer test. In an embodiment of the present invention, the first test to determine a residual oil saturation, is a saturation logging test. Typically, the Saturation Logging Test is employed to estimate an oil saturation by measuring a resistivity, an acoustic reflection, a neutron scattering or a gamma ray scattering technique. In an embodiment of the present invention, the first test to determine the residual oil saturation, is a Nuclear Magnetic Resonance (NMR) or Combined Magnetic Resonance (CMR), Combined Magnetic Resonance is a combination of Nuclear Magnetic Resonance (NMR) and Deep Resistivity Testing. The NMR measurements or CMR measurements are used to estimate the oil saturation in the reservoir. In an embodiment of the present invention, the first test to determine the residual oil saturation is an Array Dielectric Logging test. The Array Dielectric Logging Test measures the dielectric permittivity which in turn helps to estimate a hydrocarbon saturation in reservoirs.

In an embodiment of the present invention, the method further includes an additional test to determine a change in the residual oil saturation. In an embodiment of the present invention, the additional test may be carried out either after completion of the first test and before commencement of the second test, or after completion of the second test.

In an embodiment of the present invention, the additional test is an analysis of pressure data and side wall cores. In an embodiment of the present invention, the additional test is an analysis of pressure data acquired from repeated logging before and after injection of water, to measure changes in injectivity in the formation and assess the extent of emulsion formation through side wall cores.

In an embodiment of the present invention, the second test may be selected from a Time-lapse Saturation Logging Test, a Saturation Logging Test, Nuclear Magnetic Resonance (NMR), Combined Magnetic Resonance (CMR), Array Dielectric Logging Test, and combinations thereof. In an embodiment of the present invention, the second test is a Time-Lapse Saturation Logging Test. In an embodiment of the present invention, the second test is a Saturation Logging Test. The Saturation Logging Test estimates an oil saturation by measuring the resistivity, acoustic reflection, neutron scattering or gamma ray scattering. Based on these measurements, the residual oil saturation is determined. In an embodiment of the present invention, the second test is a is a Nuclear Magnetic Resonance (NMR) and Combined Magnetic Resonance (CMR). The NMR measurements or CMR measurements are used to estimate the oil saturation in the reservoir. In an embodiment of the present invention, the second test is an Array Dielectric Logging Test. This test depends on measurement of dielectric permittivity to estimate hydrocarbon saturation in reservoirs.

In an embodiment of the present invention, the method for oil recovery is a water injection method. In another embodiment of the present invention, the method for oil recovery is a low salinity water injection method. In yet another embodiment of the present invention, the method for oil recovery is a high salinity water injection method. In an embodiment of the present invention, the low salinity water is sea water. In another embodiment of the present invention, the low salinity water is fresh water. In yet another embodiment of the present invention, the low salinity water is reverse osmosis filtration water with low salinity or low salinity smart water enriched with manganese ions.

In an embodiment of the present invention, the sea water has a salt content in a range from about 0 ppm to about 40,000 ppm. In another embodiment of the present invention, the sea water has a salt content from about 40,000 ppm to about 120,000 ppm.

In an embodiment of the present invention, the low salinity water has a salt content in a range from about 0 ppm to about 5000 ppm. In another embodiment of the present invention, the low salinity water has a salt content in a range from about 500 ppm to about 5000 ppm. In yet another embodiment of the present invention, the low salinity water has a salt content in a range from about 0 ppm to about 500 ppm.

In an embodiment of the present invention, the high salinity water has a salt content in a range from about 5000 ppm to about 150,000 ppm. In another embodiment of the present invention, the high salinity water has a salt content from about 40,000 ppm to about 200,000 ppm. In yet another embodiment of the present invention, the high salinity water has a salt content from about 40,000 ppm to about 140,000 ppm.

In an embodiment of the present invention, the subsurface reservoir is a hydrocarbon reservoir. In another embodiment of the present invention, the subsurface reservoir is a low permeability reservoir. In an embodiment of the present invention, the subsurface reservoir has a permeability from about 2 millidarcy to about 10 millidarcy.

In an embodiment of the present invention, the subsurface reservoir is a carbonate reservoir or a sandstone reservoir. In yet another embodiment of the present invention, the subsurface reservoir is a subterranean reservoir or a subsea reservoir.

In an embodiment of the present invention, the well is a horizontal well or a vertical well. In another embodiment of the present invention, the well is a production or an injection well.

In an embodiment of the present invention, the first test is carried out in a vertical well or a horizontal well. In an embodiment of the present invention, the second test is carried out in a vertical or a horizontal well. In an embodiment of the present invention, the additional test is carried out on a horizontal well or a vertical well.

Another embodiment of the present invention is an in-situ method of assessing an oil recovery process from a subsurface reservoir. The method includes the steps of accessing the subsurface reservoir by means of a vertical well or a horizontal well, conducting a first test to determine a residual oil saturation, conducting an additional test to determine changes in the residual oil saturation, and conducting a second test to determine an in-situ emulsion formation.

Figure 2:
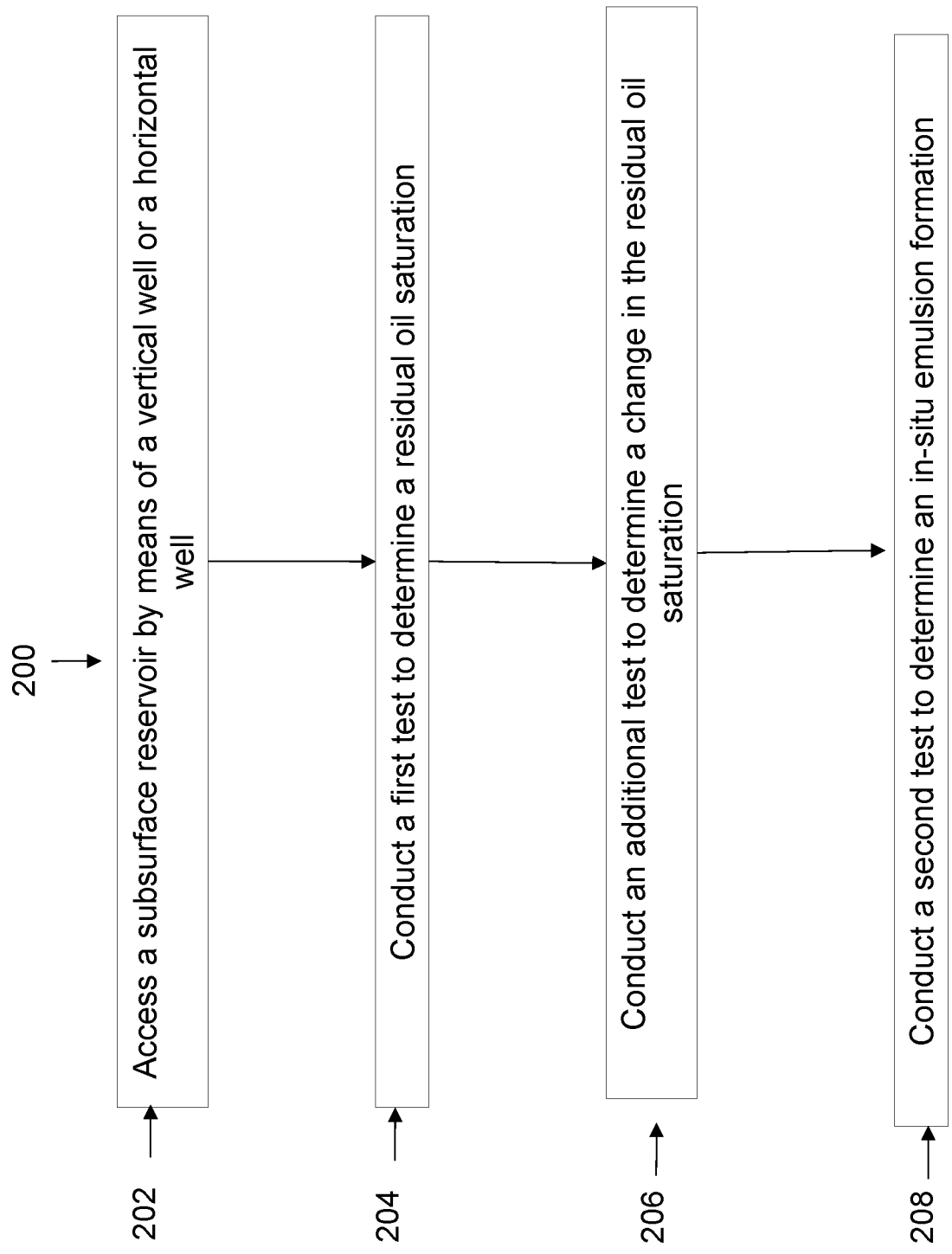
FIG. 2 is a flowchart representing an in-situ method of assessing an oil recovery process from a subsurface reservoir, according to another embodiment of the present invention.

As depicted in FIG. 2 according to an embodiment of the present invention, an in-situ method 200 for assessing an oil recovery process is shown. The method 200 includes the steps of accessing 202 the subsurface reservoir by means of a vertical or horizontal well, conducting 204 a first test to determine a residual oil saturation, conducting 206 an additional test to determine changes in the residual oil saturation, and conducting 208 a second test to determine an in-situ emulsion formation.

The above described method of assessing an oil recovery process from a subsurface reservoir has certain advantages. In an embodiment of the present invention, this method of assessing an oil recovery process eliminates the need of a separate pilot well to be drilled. In an embodiment of the present invention, this method of assessing an oil recovery process can be carried out in a production well, thus reducing the time and cost of digging a pilot well. In another embodiment of the present invention, this method of assessing an oil recovery process assists in the derisking of enhanced oil recovery processes. In another embodiment of the present invention, measurement of the parameters such as residual oil saturation, in-situ emulsion formation, and changes in the residual oil saturation, as described in the method of assessing an oil recovery process, helps to assess the amount of oil present in the reservoir, and the oil that may be profitably extracted from the reservoir.

The foregoing description of the preferred embodiment of the present invention has been presented for the purpose of illustration and description. It is not intended to be exhaustive or to limit the invention to the precise form disclosed. Furthermore, all examples recited herein are principally intended expressly to be only for pedagogical purposes to aid the reader in understanding the principles of the present subject matter and are to be construed as being without limitation to such specifically recited examples and conditions. Many modifications and variations are possible in light of the above teachings.

What is claimed is:

1. An in-situ method of assessing an oil recovery process from a subsurface reservoir, the method comprising:
   accessing the subsurface reservoir by means of a vertical well or a horizontal well;
   conducting a first test to determine a residual oil saturation; and
   conducting a second test to determine an in-situ emulsion formation;
   wherein the subsurface reservoir is a low-permeability reservoir.

2. The method of claim 1, further comprising an additional test to determine a change in the residual oil saturation.

3. The method of claim 2, wherein the additional test to determine the change in the residual oil saturation is an analysis of a pressure data and side wall cores.

4. The method of claim 1, wherein the method for oil recovery is a water injection method.

5. The method of claim 1, wherein the method for oil recovery is a low salinity water injection method.

6. The method of claim 1, wherein the well is a production well or an injection well.

7. The method of claim 1, wherein the first test is carried out in the vertical well or the horizontal well.

8. The method of claim 1, wherein the second test is carried out in the vertical well or the horizontal well.

9. The method of claim 1, wherein the first test is selected from a group consisting of a Chemical Tracer Test, a Saturation Logging Test, a Nuclear Magnetic Resonance (NMR), a Combined Magnetic Resonance (CMR), and an Array Dielectric Logging Test.

10. The method of claim 1, wherein the reservoir is a carbonate reservoir or a sandstone reservoir.

11. The method of claim 1, wherein the second test is selected from a group consisting of a time-lapse Saturation Logging Test, a Saturation Logging Test, Nuclear Magnetic Resonance (NMR), a Combined Magnetic Resonance (CMR), and an Array Dielectric Logging Test.

12. The method of claim 1, wherein the second test is carried out in a horizontal injector-producer pattern.

13. An in-situ method of assessing an oil recovery process from a subsurface reservoir, the method comprising:
   accessing the subsurface reservoir by means of a vertical well or a horizontal well;
   conducting a first test to determine a residual oil saturation; and
   conducting a second test to determine an in-situ emulsion formation;
   wherein the second test is carried out by a log-inject-log process.

14. An in-situ method of assessing an oil recovery process from a subsurface reservoir, the method comprising:
   accessing the subsurface reservoir by means of a vertical well or a horizontal well;
   conducting a first test to determine a residual oil saturation;
   conducting an additional test to determine a change in the residual oil saturation, and
   conducting a second test to determine an in-situ emulsion formation;
   wherein the subsurface reservoir is a low-permeability reservoir.

15. The method of claim 14, wherein the additional test to determine the change in the residual oil saturation is an analysis of a pressure data and side wall cores.

* * * * *